United States Patent Office 3,367,939
Patented Feb. 6, 1968

3,367,939
CERTAIN NICOTINATE ESTERS OF p-CHLORO-
PHENYL ISOPROPYL CARBINOL
Joseph Nordmann, Paris, and Henri Blaise Swierkot,
Bondy, France, assignors to Etablissements Kuhlmann,
Paris, France
No Drawing. Filed Apr. 7, 1965, Ser. No. 446,400
Claims priority, application France, Apr. 10, 1964,
970,539
2 Claims. (Cl. 260—295.5)

ABSTRACT OF THE DISCLOSURE

The compound p-chlorophenylisopropylcarbinol nicotinate represented by

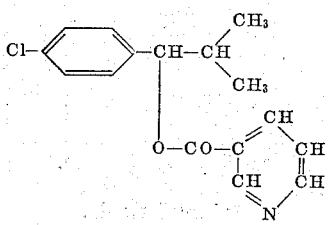

and the hydrochloride thereof. The compounds are useful for the treatment of hypercholesterolemia and hyperlipemia.

---

The present invention concerns a novel compound, its preparation and applications.

According to the present invention there is provided p-chlorophenylisopropylcarbinol nicotinate which may be represented by the formula:

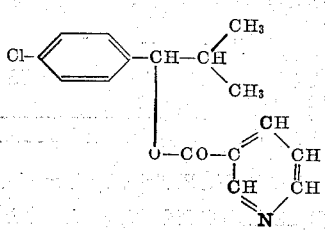

This compound, which has hypocholesterolemiant and hypolipemiant properties, may be prepared for example as the hydrochloride by condensing p-chlorophenylisopropylcarbinol with nicotinic acid chloride in an organic solvent. The free base can be obtained by hydrolysis or neutralisation of the hydrochloride.

The p-chlorophenylisopropylcarbinol used may be prepared by reacting the magnesium compound of isopropyl bromide with p-chlorobenzaldehyde. The nicotinic acid chloride used can be obtained, for example, by the action of thionyl chloride on sodium nicotinate in carbon tetrachloride.

The following example, in which the parts are parts by weight unless the contrary is mentioned, illustrates the invention without limiting it.

Example (1) *p-chlorophenylisopropylcarbinol.*—121.6 parts by weight of magnesium turnings and 400 parts by volume of ethyl ether dried over sodium are introduced into an apparatus provided with a stirrer, and then a solution of 615 parts by weight of isopropyl bromide dissolved in 1600 parts by volume of ethyl ether dried over sodium is slowly added. The introduction of this solution is regulated so that a moderate ebullition is maintained, then the solution of the magnesium compound obtained is allowed to stand overnight. This solution is slowly introduced, in an atmosphere of nitrogen and with vigorous stirring, into a solution of 632.57 parts by weight of p-chlorobenzaldehyde in 2,250 parts by volume of ethyl ether dried over sodium. The temperature of the reaction mixture is kept at about —5° C., during the introduction, then stirring is continued for 2 hours while the temperature is allowed to rise to the ambient temperature, and the product is allowed to stand overnight. The reaction mass is poured on to ice and acidified with hydrochloric acid; the ethereal layer is separated, washed with brine until neutral and dried over anhydrous sodium sulphate. The ether is evaporated on a water bath and the carbinol obtained is distilled under a vacuum of 10 mm. of mercury. 580 parts of p-chlorophenylisoprobylcarbinol passing over at between 123° C. and 125.° C. at 10 mm. of mercury are obtained.

(2) *Nicotinic acid chloride.*—120 parts of distilled water and 40 parts by weight of caustic soda are introduced into an apparatus provided with a stirrer; after complete solution and cooling to 30° C., 123 parts by weight of nicotinic acid are added. The nicotinic acid is rapidly dissolved. Then 2000 parts by volume of propanol are added, and sodium nicotinate is precipitated. This is filtered off, washed with propanol and dried in an oven at 60° C. 125 parts by weight of sodium nicotinate are obtained which is converted into the acid chloride in the following way:

725 parts by volume of carbon tetrachloride, 145 parts by weight of sodium nicotinate and finally 75 parts by volume of thionyl chloride are successively introduced while stirring and maintaining the temperature at 20° C., into an apparatus provided with a stirrer and a condenser surmounted by a guard of anhydrous calcium chloride. After stirring for an hour at this temperature, the mixture is brought to the boil and refluxed for 3 hours and then allowed to stand overnight at ordinary room temperature. It is filtered and the filtrate is concentrated under a pressure of 50 mm. of mercury. The residual oil is distilled under a vacuum of 13 mm. of mercury. At 90° C. 116 parts by weight of a colourless oil, which consists of nicotinic acid chloride, are collected.

(3) *p-Chlorophenylisopropylcarbinol nicotinate.*—100 parts by volume of dry benzene, 92.25 parts by weight of p-chlorophenylisopropylcarbinol and 70.7 parts by weight of nicotinic acid chloride are introduced into an apparatus provided with a stirrer and a condenser with a guard of anhydrous calcium chloride. The temperature rises slowly, and is maintained at 30° C. by external cooling until a lowering of the temperature is observed. The mixture is then heated under reflux for an hour, then allowed to cool, and p-chlorophenylisopropylcarbinol nicotinate is precipitated as the hydrochloride. This is filtered off, washed with isopropyl ether and dried in an oven at 70° C. 154 parts by weight of a product melting at 118–120° C. are obtained. This hydrochloride may be purified by dissolving in hot methanol and adding isopropyl ether or by crystallisation from methanol; a product melting at 124–127° C. is then obtained.

The free base may be obtained by hydrolysis (the reaction is spontaneous) or by neutralisation of the hydrochloride, for example in the following way:

400 parts by weight of p-chlorophenylisopropylcarbinol nicotinate hydrochloride are suspended in 2000 parts of distilled water in an apparatus provided with a stirrer. The free base first appears in an oily form, then in the crystalline state. The hydrochloric acid is neutralised by means of about 125 parts by volume of decanormal caustic soda solution. The product is filtered, washed with water, drained and dried under vacuum. 350 parts by weight of p-chlorophenylisopropylcarbinol nicotinate of melting point 61–62° C. on a Maquenne block are obtained. The product can be recrystallised from methanol containing water.

The p-chlorophenylisopropylcarbinol nicotinate, in the form of the base, is a white solid, crystallising in needles, with a melting point on a Maquenne block of 61–62° C. and on a Culatti block of 55–56.5° C., insoluble in water, very soluble in lipides, and soluble in alcohols. It can be determined by acidimetry with perchloric acid in glacial acetic acid medium and characterised by its picrate of melting point 107–108° C. on a Maquenne block.

The hydrochloride can be determined volumetrically by alkalimetry in an aqueous medium, gravimetrically by its conversion into the base and identified by its conversion into picrate.

Pharmacological properties

When injected intra-peritoneally into mice of C 57 Black strain, the maximum non-toxic dose of p-chlorophenylisopropylcarbinol nicotinate hydrochloride is 1 g./kg., the LD. 50 is 2.27 g./kg. and the LD. 100 is 4 g./kg. At the maximum non-toxic dose a hypothermising action is found which is shown by a fall in the central temperature. This passes in 5 hours from 40° C. to 26° C. and is maintained around 28° C. up to 8 hours after the injection. When taken orally, administered by a gastric tube to mice of the same strain, the maximum non-toxic dose is 2 g./kg. At this dose, the behaviour of the animals is normal.

The hypocholesterolemiant activity of the p-chlorophenylisopropylcarbinol nicotinate hydrochloride has been determined on rats of Sprague Dawley stock, on male animals having an average weight of 280 g. A strong hypercholesterolemia and a very strong hyperlipemia are caused artificially by an intravenous injection of Triton WR 1339 (a polyethoxylated condensation product of formaldehyde and octylphenol), in solution in physiological serum, into the vein of the penis, at a dose of 0.2 g./kg. The determinations are effected on the blood collected at the sinus of the eye, by the micro-method of Richterich and Lauber for cholesterol and for lipides by extraction in the hot with ethyl ether and precipitation of the proteins by alcohol.

The hypocholesterolemiant and hypolipemiant activity of p-chlorophenylisopropylcarbinol nicotinate hydrochloride has been studied by this test.

The product is administered before and during the period of action of the Triton at the rate of 5 intraperitoneal injections in 3 days (47 hours, 30 hours, 23 hours, 6 hours before and 1 hour after the injection of the Triton), at a dose of ⅕ of the maximum non-toxic dose determined intraperitoneally on mice, that is 0.2 g./kg. The samples of blood for the determinations are taken 18 hours after the injection of the Triton. The following results are then obtained, on two batches of 10 rats:

|  | Control rats having received the Triton | | Rats having received Triton plus the product (18 hours after) |
|---|---|---|---|
|  | Before Triton | 18 hours after |  |
| Cholesterolemia in g./l | 1.31 | 2.52 | 1.52 |
| Lipemia in g./l | 3.78 | 15.85 | 7.54 |

Thus p-chlorophenylisopropylcarbinol nicotinate affords protection in a remarkable manner against abnormally high hypercholesterolemia and abnormally high lipemia which have been caused in the animal by the injection of the Triton.

Therapeutic applications

The product is administered, for example, in the form of sugar coated compressed tablets each containing 0.3 to 0.5 g. of p-chlorophenylisopropylcarbinol nicotinate, at a daily dose of 1 to 10 tablets to patients having hypercholesterolemia and possibly hyperlipemia.

We claim:
1. The compound of the formula:

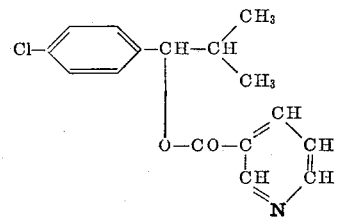

2. The hydrochloride of the compound claimed in claim 1.

References Cited
UNITED STATES PATENTS 2,524,838    10/1960    Schapfer _____ 260—295.5
3,272,832    9/1966    Toyonaka et al. ____ 260—295.5

WALTER A. MODANCE, *Primary Examiner.*

S. J. SINGER, A. L. ROTMAN, *Assistant Examiners.*